US010982574B2

(12) United States Patent
Hofmann et al.

(10) Patent No.: US 10,982,574 B2
(45) Date of Patent: Apr. 20, 2021

(54) METHOD AND APPARATUS FOR CHECKING THE PLAUSIBILITY OF THE FUNCTIONALITY OF A CRANKCASE VENTILATION SYSTEM

(71) Applicant: CPT Group GmbH, Hannover (DE)

(72) Inventors: Andreas Hofmann, Mitterfels (DE); Andreas Holzeder, Neufahrn / Niederbayern (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 8 days.

(21) Appl. No.: 16/327,547

(22) PCT Filed: Aug. 8, 2017

(86) PCT No.: PCT/EP2017/070043
§ 371 (c)(1),
(2) Date: Feb. 22, 2019

(87) PCT Pub. No.: WO2018/036809
PCT Pub. Date: Mar. 1, 2018

(65) Prior Publication Data
US 2019/0226368 A1 Jul. 25, 2019

(30) Foreign Application Priority Data
Aug. 26, 2016 (DE) ..................... 10 2016 216 122.9

(51) Int. Cl.
*F02D 41/22* (2006.01)
*F01M 13/00* (2006.01)
(Continued)

(52) U.S. Cl.
CPC ......... *F01M 13/00* (2013.01); *F02D 41/0025* (2013.01); *F02D 41/22* (2013.01);
(Continued)

(58) Field of Classification Search
CPC ............ F01M 13/00; F01M 2013/0044; F02D 41/0025; F02D 41/22; F02D 41/221; F02M 35/10222; F02M 35/1038
See application file for complete search history.

(56) References Cited

U.S. PATENT DOCUMENTS 5,792,949 A * 8/1998 Hewelt ................ G01M 3/025
123/41.86
9,631,567 B2 * 4/2017 Song ................... F02D 41/2474
(Continued)

FOREIGN PATENT DOCUMENTS

DE 10 2007 046 489 B3 5/2009 ............ F02D 45/00
DE 10 2008 002 721 A1 12/2009 ............ F01M 11/10
(Continued)

OTHER PUBLICATIONS

Frank Kimmich, Fault detection for modern Diesel engines using signal- and process model-based methods, Mar. 3, 2004 (Year: 2004).*

(Continued)

*Primary Examiner* — Syed O Hasan
(74) *Attorney, Agent, or Firm* — Slayden Grubert Beard PLLC

(57) ABSTRACT

Various embodiments may include a method for checking the plausibility of the functionality of a crankcase ventilation system of an internal combustion engine, wherein crankcase ventilation system has a crankcase, an intake tract equipped with an intake manifold, and a connecting line arranged between the crankcase and the intake manifold, the method comprising: detecting an occurrence of a negative load change; in response, comparing a measured intake manifold pressure with a modelled intake manifold pressure using acquired operating variables of the internal combustion engine and of a crankcase model; and determining on the basis of the comparison result whether the connecting line (Continued)

arranged between the crankcase and the intake manifold becomes blocked or drops out.

4 Claims, 6 Drawing Sheets

(51) Int. Cl.
    *F02D 41/00*             (2006.01)
    *F02M 35/10*           (2006.01)
    *F02D 41/14*            (2006.01)

(52) U.S. Cl.
    CPC ....... *F02D 41/221* (2013.01); *F02M 35/1038* (2013.01); *F02M 35/10222* (2013.01); *F01M 2013/0044* (2013.01); *F02D 2041/1433* (2013.01); *F02D 2041/228* (2013.01); *F02D 2200/0406* (2013.01); *F02D 2200/0408* (2013.01); *F02D 2250/08* (2013.01); *Y02T 10/40* (2013.01)

(56) References Cited

U.S. PATENT DOCUMENTS

| | | | | |
|---|---|---|---|---|
| 9,664,079 | B2* | 5/2017 | Jentz | .................... F01M 11/10 |
| 2009/0088949 | A1 | 4/2009 | Pache et al. | .................. 701/103 |
| 2013/0228006 | A1 | 9/2013 | Kuhn et al. | ................. 73/114.33 |
| 2014/0081551 | A1* | 3/2014 | Rollinger | ............. F01M 13/023 701/101 |
| 2015/0047424 | A1 | 2/2015 | Song | .......................... 73/114.73 |
| 2015/0114326 | A1* | 4/2015 | Burkhardt | ............ F01M 13/023 123/41.86 |

FOREIGN PATENT DOCUMENTS

| | | | | |
|---|---|---|---|---|
| DE | 10 2011 075 744 A1 | 11/2012 | ............. | F02D 41/18 |
| DE | 10 2011 086 361 A1 | 5/2013 | ............. | G01M 3/26 |
| DE | 102011086361 | * 5/2013 | ............. | F02D 41/18 |
| DE | 10 2012 209 107 B4 | 2/2014 | ............. | F02D 41/22 |
| DE | 10 2013 218 265 A1 | 5/2014 | ............. | F01M 13/02 |
| DE | 10 2014 111 476 A1 | 2/2015 | ............. | F02D 41/02 |
| DE | 10 2013 224 030 B4 | 6/2015 | ............. | F01M 13/00 |
| EP | 2 616 655 B1 | 1/2015 | ............. | F01M 13/00 |
| WO | 2018/036809 A1 | 3/2018 | ............. | F01M 13/00 |

OTHER PUBLICATIONS

Korean Office Action, Application No. 2020013576369, 5 pages, dated Feb. 21, 2020.
German Office Action, Application No. 10 2016 216 122.9, 6 pages, dated Apr. 7, 2017.
International Search Report and Written Opinion, Application No. PCT/EP2017/070043, 20 pages, dated Nov. 17, 2017.

* cited by examiner

METHOD AND APPARATUS FOR CHECKING THE PLAUSIBILITY OF THE FUNCTIONALITY OF A CRANKCASE VENTILATION SYSTEM

CROSS-REFERENCE TO RELATED APPLICATIONS

This application is a U.S. National Stage Application of International Application No. PCT/EP2017/070043 filed Aug. 8, 2017, which designates the United States of America, and claims priority to DE Application No. 10 2016 216 122.9 filed Aug. 26, 2016, the contents of which are hereby incorporated by reference in their entirety.

TECHNICAL FIELD

The present disclosure relates to internal combustion engines. Various embodiments may include a method and an apparatus for checking the plausibility of the functionality of a crankcase ventilation system.

BACKGROUND

Without ventilating measures during the operation of an internal combustion engine, a pressure which is increased in comparison with the atmosphere would build up in the crankcase of the internal combustion engine, which increased pressure is mainly caused by the blow-by of combustion gases from the respective combustion chamber and by the formation of oil mist. In order to avoid these high pressures in the crankcase it is already known to connect the crankcase to the air system via an oil separation apparatus using one or more ventilating lines, so that the gas mixture is fed to the cylinders for combustion via the intake air system and cannot pass into the surroundings.

The specified ventilating lines generally open both into a region of the air system upstream of a throttle valve and into the intake manifold downstream of the throttle valve. Faults can occur when the engine system is assembled or during repair processes. For example, the ventilating line between the oil separation apparatus and the air system can be disconnected. This can be caused by dropping out of the respective connecting line owing to vibrations occurring during operation or else it being forgotten to plug in the ventilating line again after repair works. This brings about leakage in the air system and causes emissions to escape from the crankcase into the environment.

It is already known to diagnose leakage in the air system. However, in this context it is not possible to determine whether this leakage of the air system has been caused by dropping out or absence of the ventilating line or by something else. A further fault source is blockage of the ventilating line, such as can be caused, for example, by freezing or by deposits in the ventilating line. When such blockage of the ventilating line occurs, for example, between the oil separation apparatus and the air system, it can result in a rise in pressure in the crankcase, which can, under certain circumstances, give rise to a leak which can be caused by the oil measuring rod being forced out. As result, hydrocarbons can pass from the crankcase into the environment.

DE 10 2007 046 489 B3 describes a method for operating an internal combustion engine with the ventilating of a crankcase into an intake tract. With this method, operating parameters of the internal combustion engine are acquired and a fuel mass flow from the crankcase into the intake tract is determined as a function of the acquired operating parameters. The internal combustion engine is controlled or monitored as a function of the fuel mass flow from the crankcase into the intake tract. Within the scope of this known method, the determined fuel mass flow from the crankcase into the intake tract is checked for plausibility. Outgassing fuel from an engine oil of a spark ignition engine is typically found to occur only starting from a temperature of 65° C. or 70° C., but with the constant rotational speed and with the constant load it is only slowly variable. Furthermore, it is taken into account here that the concentration of the fuel evaporating from the lubricant in the overall mass flow only has a weak dependence on the rotational speed and the load, and varies only slowly as a function of time.

DE 10 2008 002 721 A1 describes a method and an apparatus for diagnosing a crankcase ventilation system in internal combustion engines. Within the scope of the checking of the functionality of the crankcase ventilation system, a ventilating line between the crankcase and the air system of the internal combustion engine is disconnected during a checking time period, the change in an operating parameter of the internal combustion engine during the checking time period is determined, and a fault in the crankcase ventilation system is detected on the basis of the determined change in the operating parameter, which operating parameter is the lambda value of the exhaust gas of the internal combustion engine.

EP 2 616 655 B1 describes a method and an apparatus for diagnosing a crankcase ventilation system of internal combustion engines in which the crankcase is connected to an air feed system of the internal combustion engine via a ventilating apparatus. In this method, a pressure difference between an ambient pressure and a pressure in the crankcase is determined, and a fault in the ventilating apparatus is detected as a function of the pressure difference if a release condition is satisfied. The release condition is satisfied if an air mass flow which is filtered by a low-pass filter exceeds a first threshold value in absolute terms. The low-pass filtering of the air mass flow is carried out with a time constant which is predefined in such a way that it is equal to or greater than a time constant which results from a delayed response of the crankcase pressure when the air mass flow changes.

DE 10 2012 209 107 B4 describes a method and an apparatus for operating an internal combustion engine in which a crankcase, an intake tract with a throttle valve and a crankcase ventilation system with a switchable shut-off valve are provided. In addition, a plurality of sensors which acquire different operating variables of the internal combustion engine are provided. At least one of the sensors generates a measurement signal which is reflective of a load variable of the internal combustion engine. Depending on the acquired operating variables, at least one estimated load variable is determined by means of a dynamic model, and a correction value of a characteristic value is determined as a function of a deviation of the estimated load variable. The correction value and the characteristic value are used within the scope of the dynamic model. In order to carry out a diagnosis, one or more diagnostic switching cycles are controlled, during which the shut-off valve is placed in a closed position for a predefined first time period, and the shut-off valve is placed in an open switched position for a predefined second time period. Depending on a change in the correction value in response to the one or more diagnostics switching cycles, a diagnostic value is determined which is representative of a satisfactory or non-satisfactory state of the shut-off valve.

DE 10 2013 224 030 B4 describes a method and an apparatus for checking the functionality of a crankcase ventilation apparatus of an internal combustion engine. The internal combustion engine has a crankcase, a crankcase ventilation apparatus and an intake tract. In this known method, a diagnostic value is determined using a dynamic model, which diagnostic value is representative of the leak-tightness or lack of leak-tightness of at least one of the components of the crankcase ventilation apparatus to which the line section of a first duct downstream of the shut-off valve, the crankcase, a second duct and a pressure-regulating valve belong.

SUMMARY

The teachings of the present disclosure describe methods and apparati for checking the plausibility of the functionality of a crankcase ventilation system, in which method and apparatus the expenditure on components is reduced. As an example, some embodiments include a method for checking the plausibility of the functionality of a crankcase ventilation system of an internal combustion engine, which crankcase ventilation system has a crankcase (20), an intake tract (1) which is equipped with an intake manifold (13), and a connecting line (53) which is arranged between the crankcase (20) and the intake manifold (13), characterized in that, after the occurrence of a negative load change, a comparison of a measured intake manifold pressure with a modelled intake manifold pressure is carried out using acquired operating variables of the internal combustion engine and of a crankcase model (66), and on the basis of the comparison result it is determined whether the connecting line (53) arranged between the crankcase (20) and the intake manifold (13) becomes blocked or drops out.

In some embodiments, a method includes:
S1: Interrogation as to whether the measured intake manifold pressure is higher than the measured ambient pressure,
S2: If the measured intake manifold pressure is higher than the ambient pressure, waiting until a negative load change occurs,
S3: After the occurrence of a negative load change, carrying out an interrogation as to whether the measured intake manifold pressure undershoots the measured ambient pressure,
S4: Activating a diagnostic window if the measured intake manifold pressure undershoots the measured ambient pressure, S5: Determining the difference or the integral of the difference between the measured intake manifold pressure and the modelled intake manifold pressure within the diagnostic window,
S6: Interrogation as to whether the determined difference or the integral of the difference is greater than a predefined threshold value, and
S7: If the determined difference or the integral of the difference is greater than the threshold value, detecting whether the connecting line (53) arranged between the crankcase (20) and the intake manifold (13) has a blockage or drops out.

In some embodiments, after it has been detected that the connecting line (53) arranged between the crankcase (20) and the intake manifold (13) has a blockage or drops out, a measure is taken.

In some embodiments, as a measure an entry is made in a fault register and/or the crankcase function is deactivated and/or a fault is displayed.

As another example, some embodiments include an apparatus for checking the plausibility of the functionality of a crankcase ventilation system of an internal combustion engine, which crankcase ventilation system has a crankcase (20), an intake tract (1) which is equipped with an intake manifold (13), and a connecting line (53) arranged between the crankcase (20) and the intake manifold (13), characterized in that said apparatus has a control apparatus (6) which is designed to carry out a method as described above.

BRIEF DESCRIPTION OF THE DRAWINGS

Further properties of the teachings herein are elucidated from the exemplary explanation thereof below, given with reference to the figures. In the drawings.

DETAILED DESCRIPTION

Various embodiments of the teachings herein permit a fault to be detected in the region of the connecting line, e.g., embodied as a connecting hose, between the crankcase and the intake manifold, without the need for the presence of additional components such as a switching valve, differential pressure sensor, etc. It furthermore permits in many cases detection of a fault without using a lambda sensor or a deflection of a lambda controller. It additionally permits the presence of leakage in the intake manifold to be differentiated from the presence of dropping out of the connecting hose between the crankcase and the intake manifold. It also permits the dropping out of the connecting line, preferably embodied as a connecting hose, between the crankcase and the intake manifold to be detected. In addition, a method incorporating the teachings herein operates comparatively quickly, since it is not necessary to compare data items from a plurality of successive idling phases with one another.

Figure 1:
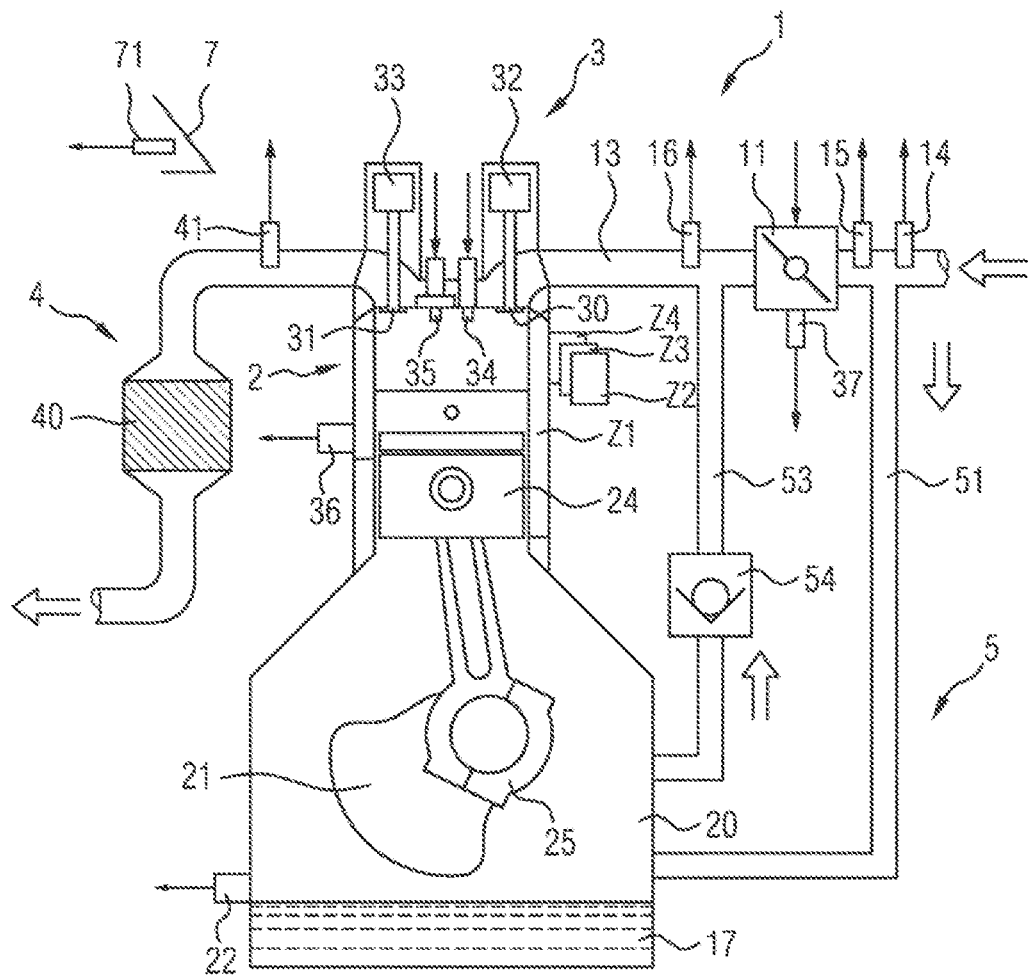
FIG. 1 shows a sketch of an internal combustion engine which is equipped with an apparatus for checking the plausibility of the functionality of a crankcase ventilation system incorporating the teachings of the present disclosure.
Figure 1:
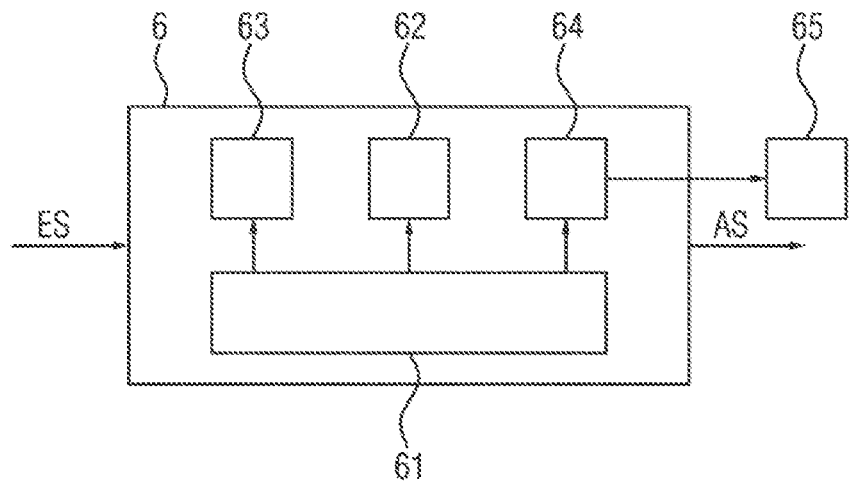

FIG. 1 shows a sketch of an internal combustion engine which is equipped with an apparatus for checking the plausibility of the functionality of a crankcase ventilation system incorporating the teachings of the present disclosure. The internal combustion engine comprises an intake tract 1, an engine block 2, a cylinder head 3 and an exhaust tract 4. The intake tract 1 comprises a throttle valve 11, and an intake manifold 13, which is fed towards a cylinder Z1 via an intake duct into the engine block 2.

The engine block 2 comprises a crankcase 20 which accommodates a crankshaft 21, and also a connecting rod 25 which is coupled to a piston 24 of the cylinder Z1 and which couples the crankshaft 21 to the piston 24 of the cylinder Z1. The crankcase 20 is additionally filled partially with lubricant, in particular engine oil, which is circulated and filtered by means of devices which are not illustrated. Moreover, the crankcase 20 comprises a free volume which can extend, if appropriate, as far as the cylinder head 3.

The cylinder head 3 comprises a valve drive with a gas inlet valve 30 and a gas outlet valve 31 and associated valve drives 32, 33. The cylinder head 3 additionally comprises an injection valve 34 and a spark plug 35. Alternatively, the injection valve 34 can also be arranged in the intake tract 1.

The exhaust gas tract 4 comprises an exhaust gas catalytic converter 40, which is embodied, for example, as a three-way catalytic converter.

In order to direct the fuel vapors which are present in the crankcase 20 into the intake tract 1, a crankcase ventilation apparatus 5 is provided. The latter has a first duct 51 which branches off from the intake tract 1 upstream of the throttle valve and leads to the crankcase 20. The first duct 51 is pneumatically coupled to the free volume of the crankcase 20. Fresh air can flow into the crankcase 20 through this duct 51. Furthermore, a second duct 53 is provided which connects the free volume of the crankcase 20 pneumatically to the intake tract 1 at a point downstream of the throttle valve 11. The free volume of the crankcase 20 can be ventilated by means of the two ducts 51 and 53. An oil mist separator provided in the crankcase ventilation apparatus 5 is not illustrated for reasons of clarity.

A regulating valve 54 in the form of an underpressure valve is arranged in the second duct 53, which underpressure valve automatically adapts an effective cross-section of the second duct 53, to be precise in such a way that a defined underpressure with respect to the ambient pressure is set in the crankcase 20.

When there is a suitable low pressure in the intake tract 1 downstream of the throttle valve 11, to be precise in the region in which the second duct 53 opens into the intake tract 1, the gases located in the free volume of the crankcase 20 flow back into the intake tract 1.

The illustrated apparatus furthermore has a control apparatus 6. Sensors which acquire operating variables of the internal combustion engine and make available a measurement signal which represents the respectively acquired operating variable are assigned to said control device 6. These input signals of the control apparatus 6 are summarized in FIG. 1 and denoted by the reference symbol ES. The control apparatus is designed to use associated actuation signals to actuate, as a function of the specified operating variables, actuator elements which are assigned to the internal combustion engine. These actuation signals are summarized in FIG. 1 and denoted by the reference symbol AS.

The sensors may include, for example, a pedal position encoder 71 which acquires the position of an accelerator pedal 7, an air mass flow meter 14 which acquires an air mass flow upstream of the throttle valve 11, a temperature sensor 15 which acquires an intake air temperature, a pressure sensor 16 which acquires an intake manifold pressure, a crankshaft angle sensor 22 which acquires a crankshaft angle to which a rotational speed is assigned, a throttle valve angle sensor 37, a temperature sensor 36 which acquires the temperature of the internal combustion engine, and an exhaust gas probe 41 which acquires a residual oxygen content of the exhaust gas and outputs a measurement signal which is characteristic of the air/fuel ratio in the cylinder Z1 during the combustion of the air/fuel mixture.

The actuator elements may include, for example, the throttle valve 11, the gas inlet and gas outlet valves 30, 31, the injection valve 34 and the spark plug 35.

Apart from the cylinder Z1, other further cylinders Z2 to Z4 are also provided, and corresponding further actuator elements are assigned thereto respectively.

The control apparatus 6 comprises a processor unit 61 which is coupled to a program memory 62, a data memory 63 and a fault memory 64. The fault memory 64 is connected to a fault display apparatus 65. Programs for operating the internal combustion engine are stored in the program memory 62 and are executed during the operation of the internal combustion engine.

Figure 2:
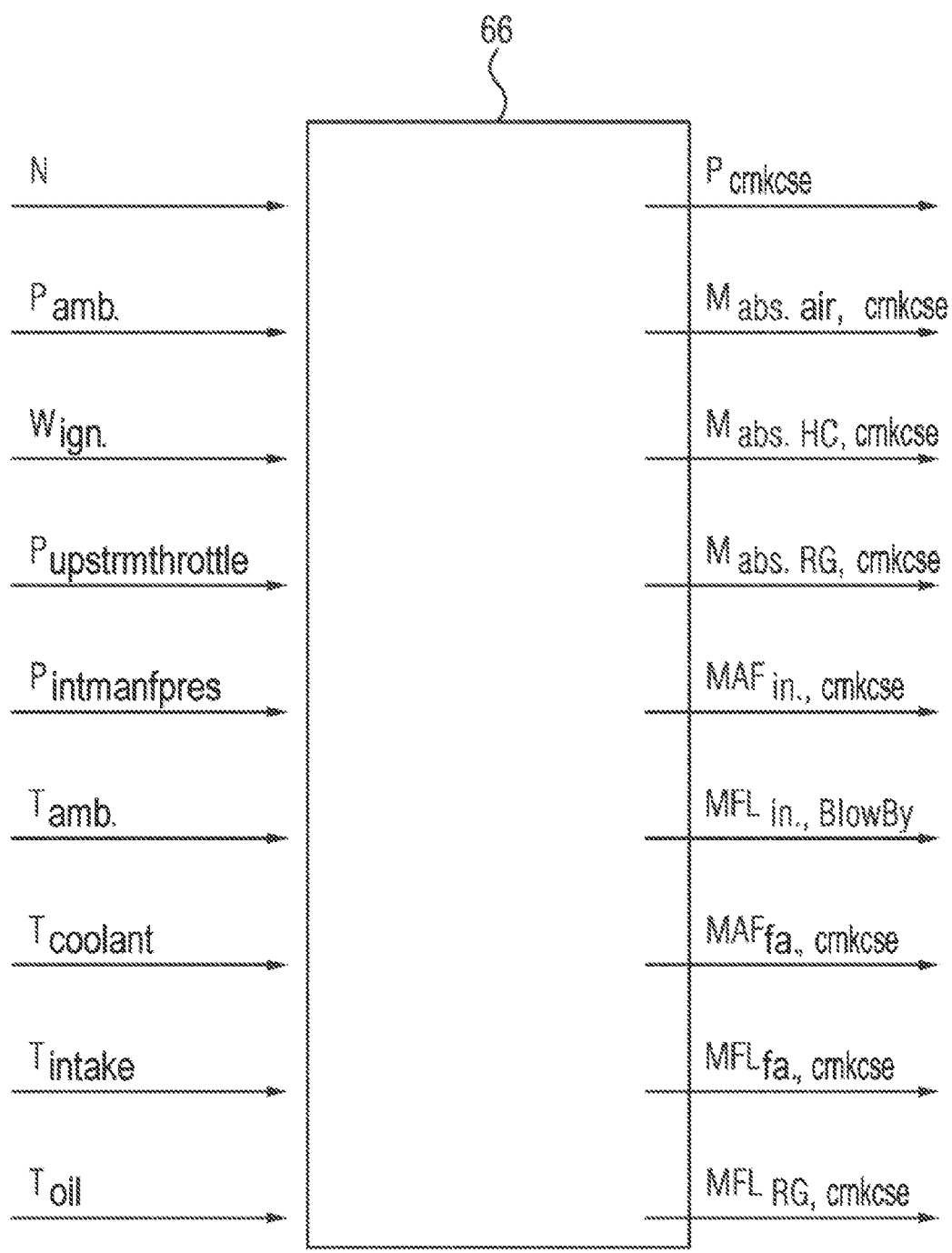
FIG. 2 shows a sketch illustrating a crankcase model incorporating the teachings of the present disclosure.

These programs may include a basically known intake manifold model which calculates a modelled intake manifold pressure. The latter is adjusted to the measured intake manifold pressure by means of an intake manifold model control factor (INSY controller). These programs furthermore include a crankcase model 66 which is illustrated in FIG. 2 and whose output signals are fed to the intake manifold model which uses the output signals of the crankcase model for more precise calculation of the modelled intake manifold pressure. The following input signals may be fed to the crankcase model 66:

the engine speed N,
the ambient pressure $P_{amb}$,
the ignition angle $W_{ign}$,
the pressure upstream of the throttle valve $P_{upstrmthrottle}$,
the intake manifold pressure $P_{intmanfpres}$,
the ambient temperature $T_{amb}$,
the coolant temperature $T_{coolant}$,
the intake manifold temperature $T_{intake}$, and
the oil temperature $T_{oil}$.

The following output signals may be determined from these input signals by means of the crankcase model 66:

the pressure in the crankcase $P_{crnkcse}$,
the absolute air mass in the crankcase $M_{abs.air,crnkcse}$,
the absolute fuel mass in the crankcase $M_{abs.HC,crnkcse}$,
the absolute residual gas mass in the crankcase $M_{abs.RG,crnkcse}$,
the fresh air mass flow into the crankcase $MAF_{in,crnkcse}$,
the blow-by mass flow into the crankcase $MFL_{in,BlowBy}$,
the fresh air mass flow out of the crankcase $MAF_{fa,crnkcse}$,
the vaporized mass flow out of the crankcase $MFL_{fa,crnkcse}$ and
the residual gas mass flow out of the crankcase $MFL_{RG,crnkcse}$.

In some embodiments, the crankcase model 66 may be used to determine the air mass or gas mass in the intake manifold as precisely as possible. An indication of the fact that the air mass or gas mass in the intake manifold is correctly modelled is the correspondence between the modelled and the measured intake manifold pressure.

When negative load changes, referred to as "tip outs", occur, the influence of the air mass which flows back into the intake manifold 13 through the crankcase 20 is particularly large. This flowing of the air mass or gas mass out of the crankcase 20 can be detected on the basis of the profile of the intake manifold pressure, i.e. from a comparison of the profile of the modelled intake manifold pressure with the measured intake manifold pressure.

The following diagnostic possibilities are obtained by means of the crankcase model 66 described above:

A blockage in the connecting line 53, implemented as a connecting hose, between the crankcase 20 and the intake manifold 13 can be detected as passive detection. This passive detection is based on the fact that when a negative load change is present, an intact crankcase ventilation system can be actuated by virtue of the fact that a rise in the intake manifold pressure can be detected, said rise starting when the ventilation of the crankcase starts and ending when the pressure-regulating valve 54 closes.

This rise in pressure, which can be determined both chronologically and quantitatively by using the crankcase model, is used as a decision criterion for the specified passive detection of a blockage in the connecting line 53, implemented as a connecting hose, between the crankcase 20 and the intake manifold 13, wherein the measured intake manifold pressure is compared with the modelled intake manifold pressure. If the measured intake manifold pressure is below the modelled intake manifold pressure, then the presence of a blockage is detected. A precondition for such a diagnostic decision is that a low intake manifold model control factor (INSY controller) is present.

Figure 3:
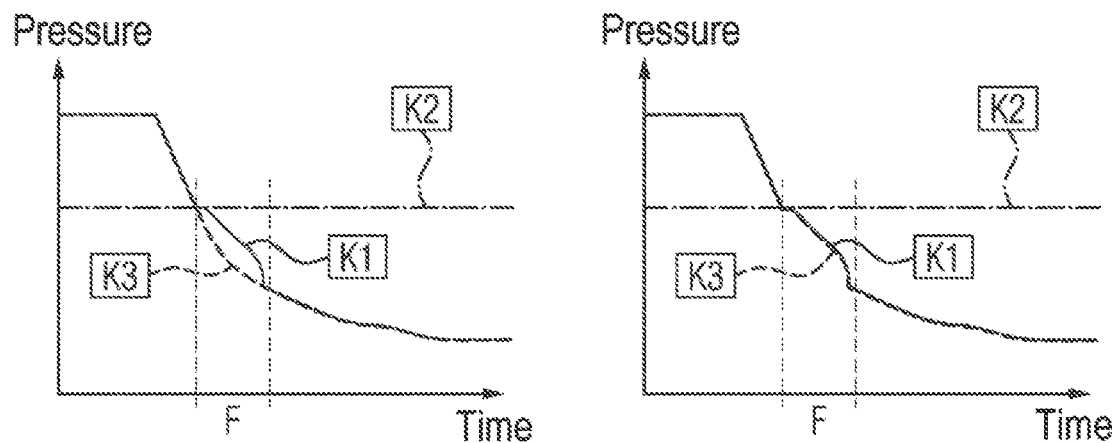
FIG. 3 shows a sketch illustrating passive detection of a blockage in the connecting line between the crankcase and the intake manifold incorporating the teachings of the present disclosure.

Such passive detection of a blockage in the connecting line 53, implemented as a connecting hose, between the crankcase 20 and the intake manifold 13 is illustrated in FIG. 3. In this context, the presence of a fault is illustrated in the left-hand diagram of FIG. 3, since in the diagnostic window F shown there the modelled intake manifold pressure K1 deviates from the measured intake manifold pressure K3. The diagnostic window is opened when the measured intake manifold pressure undershoots the ambient pressure, which is illustrated by the line K2, and is closed again after the expiry of a predefined time period.

In the right-hand diagram of FIG. 3, the fault-free state is illustrated, since in the diagnostic window F shown there the modelled intake manifold pressure K1 corresponds to the measured intake manifold pressure K3. A blockage in the connecting line 53, implemented as a connecting hose, between the crankcase 20 and the intake manifold 13 can be confirmed as active detection. This active detection can be carried out, for example, chronologically after passive detection and can be used to set up a request to a diagnostic coordinator to initiate more detailed checking of the crankcase or to take other measures. In order to carry out this active detection, when a negative load change is present, the crankcase model is deactivated in the sense that all the mass flows are set to 0 kg/h. Then, when a blockage is present in the connecting hose 53 between the crankcase 20 and the intake manifold 13, the modelled pressure is approximately equal to the measured pressure. Furthermore, when a blockage is present, the deflection of a lambda controller which is present is only small. If no blockage is present, the deflection of a lambda controller which is present is significantly larger. The presence of a low intake manifold model controller factor (INSY controller) is also a precondition for this diagnostic decision.

Figure 4:
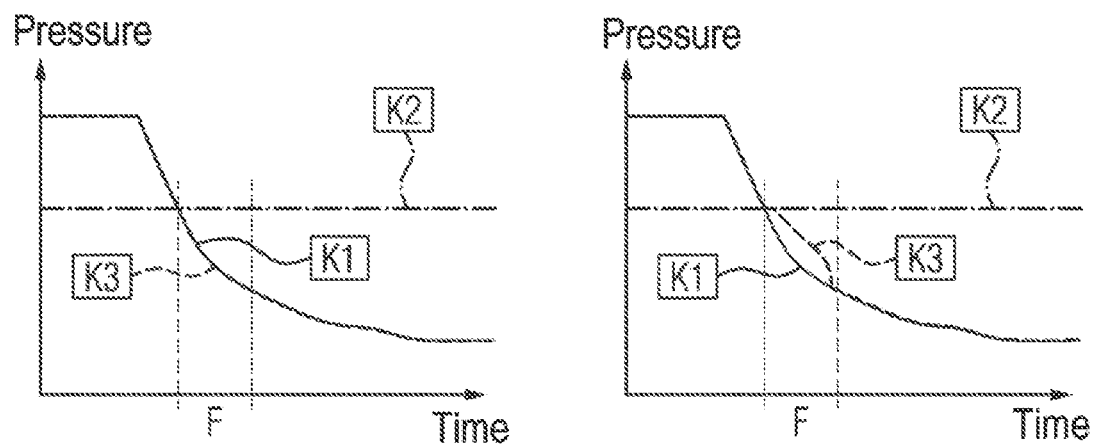
FIG. 4 shows a sketch illustrating active detection of a blockage in the connecting line between the crankcase and the intake manifold incorporating the teachings of the present disclosure.

Such active detection of a blockage in the connecting line 53, implemented as a connecting hose, between the crankcase 20 and the intake manifold 13, is illustrated in FIG. 4. In this context, the presence of a fault is illustrated in the left-hand diagram of FIG. 4, since in the diagnostic window F shown there the modelled intake manifold pressure K1 corresponds to the measured intake manifold pressure K3. The diagnostic window is also opened here when the measured intake manifold pressure undershoots the ambient pressure, which is illustrated by the line K2, and is closed again after the expiry of a predefined time period.

In the right-hand diagram of FIG. 4, the fault-free state is illustrated, since in the diagnostic window F shown there the modelled intake manifold pressure K1 deviates from the measured intake manifold pressure K3.

Furthermore, dropping out or absence of the connecting line 53, implemented as a connecting hose, between the crankcase 20 and the intake manifold 13 can be detected as passive detection. This detection is based on the fact that dropping out of the specified connecting hose in steady-state operation is equivalent to leakage in the intake manifold, wherein an intake manifold model controller (INSY controller) which is present compensates this leakage by a change in the throttle valve angle. When a negative load change is present, there is the possibility of differentiating between the specified leakage in the intake manifold 13 and a dropped-out connecting hose 53 between the crankcase 20 and the intake manifold 13. This is because when a negative load change is present a leakage in the intake manifold becomes apparent in such a way that the mass flow which exits the crankcase can still be detected on the basis of a non-continuous drop in pressure. In contrast with this, dropping out of the connecting hose 53 between the crankcase 20 and the intake manifold 13 can be detected on the basis of a continuous drop in pressure. The deviation between the measured intake manifold pressure and the modelled intake manifold pressure is large during the ventilation of the crankcase 20. In both above-mentioned cases, it is necessary for the respective diagnostic decision that there is a large intake manifold model controller factor (INSY controller). This large intake manifold model controller factor serves as the differentiating criterion with respect to the presence of a blockage.

Figure 5:
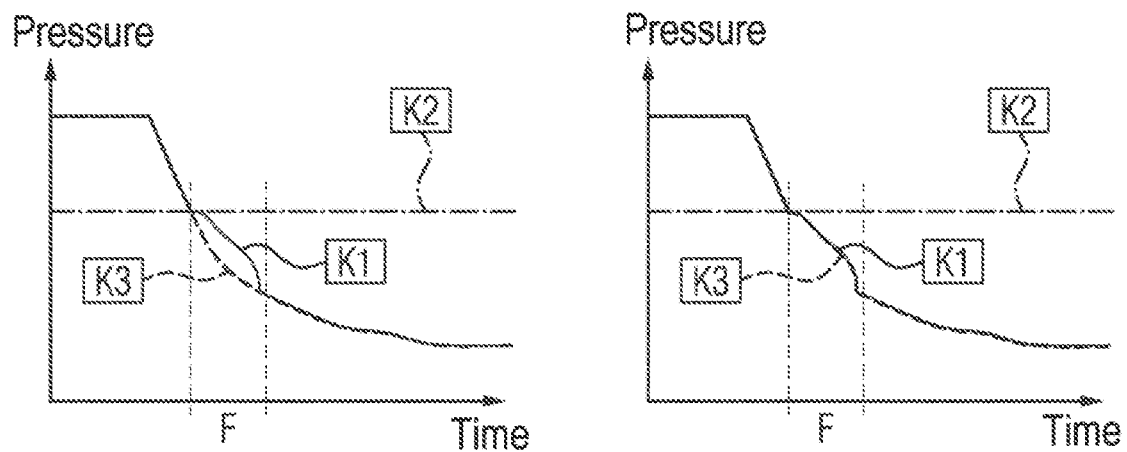
FIG. 5 shows a sketch illustrating passive detection of dropping out or absence of the connecting line between the crankcase and the intake manifold incorporating the teachings of the present disclosure.

Such passive detection of dropping out of the connecting hose 53 provided between the crankcase 20 and the intake manifold 13 is illustrated in FIG. 5. In this context, the presence of a fault is illustrated in the left-hand diagram of FIG. 5, since in the diagnostic window F shown there the modelled intake manifold pressure K1 deviates from the measured intake manifold pressure K3. The diagnostic window is opened when the measured intake manifold pressure undershoots the ambient pressure, which is illustrated by the line K2, and is closed again after the expiry of a predefined time period.

In the right-hand diagram of FIG. 5, the fault-free state is illustrated, since in the diagnostic window F shown there the modelled intake manifold pressure K1 corresponds to the measured intake manifold pressure K3. Dropping out of the connecting hose 53 between the crankcase 20 and the intake manifold 13 can be confirmed as active detection. This active detection can be carried out, for example, chronologically after passive detection and can be used to set up a request to a diagnostic coordinator to initiate more detailed checking or other measures. In order to carry out this active detection, when a negative load change is present, the crankcase model is deactivated in the sense that all the mass flows are set to 0 kg/h. Then, when dropping out of the connecting hose between the crankcase 20 and the intake manifold 13 has occurred, the modelled pressure is approximately equal to the measured pressure. The presence of a high intake manifold model controller factor (INSY controller) is also a precondition for this diagnostic decision, in order to be able to differentiate from a blockage of the connecting hose 53.

Figure 6:
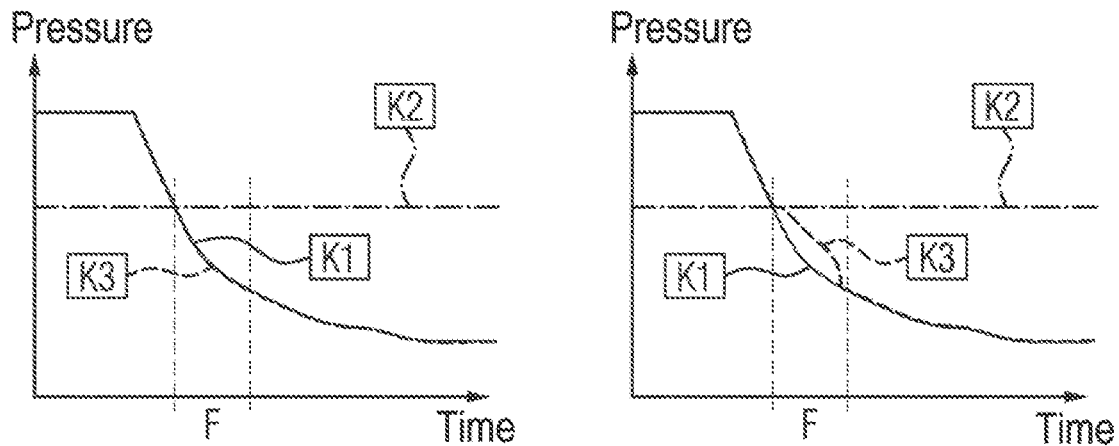
FIG. 6 shows a sketch illustrating active detection of dropping out or absence of the connecting line between the crankcase and the intake manifold incorporating the teachings of the present disclosure.

Such active detection of dropping out of the connecting hose 53 between the crankcase 20 and the intake manifold 13 is illustrated in FIG. 6. In this context, the presence of a fault is illustrated in the left-hand diagram of FIG. 6, since in the diagnostic window F shown there the modelled intake manifold pressure K1 corresponds to the measured intake manifold pressure K3. The diagnostic window is also opened here when the measured intake manifold pressure undershoots the ambient pressure, which is illustrated by the line K2, and is closed again after the expiry of a predefined time period.

In the right-hand diagram of FIG. 6, the fault-free state is illustrated, since in the diagnostic window F shown there the modelled intake manifold pressure K1 deviates from the measured intake manifold pressure K3.

Figure 7:
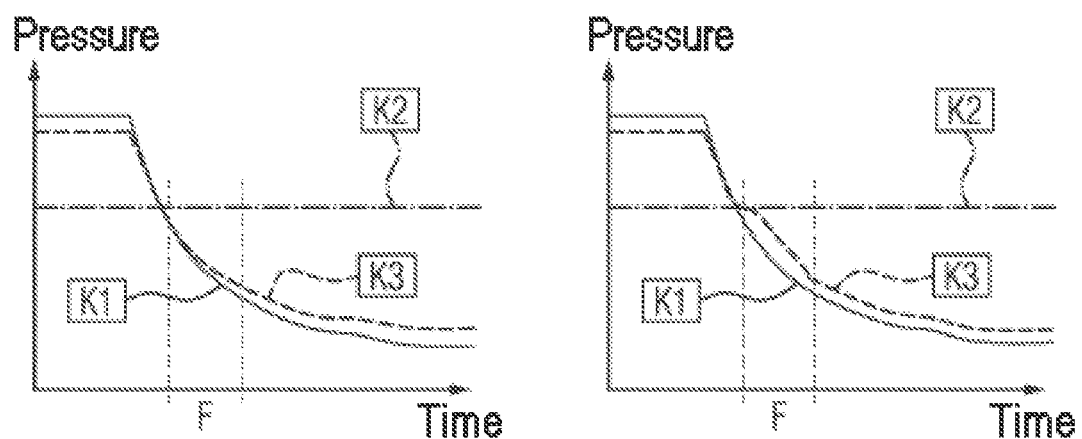
FIG. 7 shows a sketch illustrating active detection of dropping out or absence of the connecting line between the crankcase and the intake manifold when the intake manifold model controller is switched off incorporating the teachings of the present disclosure; and, FIG. 8 shows a flowchart illustrating a method for checking the plausibility of the functionality of a crankcase ventilation system incorporating the teachings of the present disclosure.

A further diagnostic possibility is illustrated in FIG. 7. This further diagnostic possibility corresponds essentially to the diagnostic possibilities explained with reference to FIGS. 5 and 6 but, in particular it differs from these in that as a further precondition for the diagnosis the intake manifold model controller (INSY controller) is switched off. A difference from the case shown in the right-hand illustration of FIG. 6 is that the deviation between the measured intake manifold pressure and the modelled intake manifold pressure is even greater than in the example shown in the right-hand illustration of FIG. 6.

The presence of a fault is illustrated in the left-hand diagram of FIG. 7, since in the diagnostic window F there the modelled intake manifold pressure K1 corresponds to the measured intake manifold pressure K3. The presence of a fault-free case is illustrated in the right-hand diagram of FIG. 7, since in the diagnostic window F there the modelled intake manifold pressure K1 deviates from the measured intake manifold pressure K3.

Figure 8:
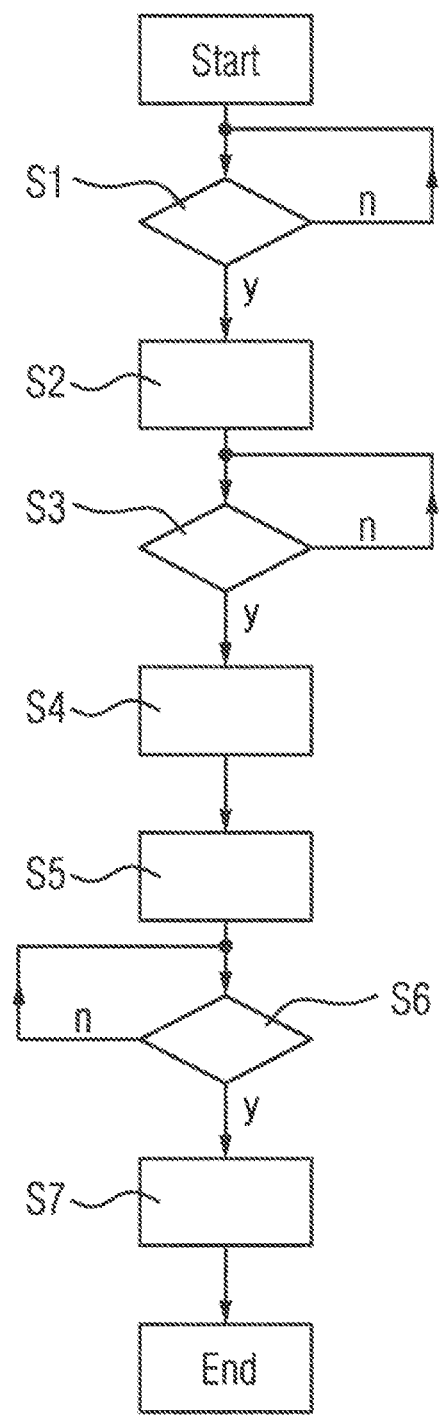

FIG. 8 shows a flowchart relating to the checking of the plausibility of a method for checking the functionality of a crankcase ventilation system. After the start of the method, in a step S1 an interrogation occurs as to whether the measured intake manifold pressure is higher than the ambient pressure. If this is not the case, the process jumps back to step S1. On the other hand, if this is the case, the process continues to a step S2.

In the step S2 the process waits until a negative load change occurs. After the occurrence of a negative load change, in a step S3 an interrogation occurs as to whether the measured intake manifold pressure undershoots the ambient pressure. If this is not the case, the process returns to step S3. On the other hand, if this is the case, a diagnostic window is activated in a step S4.

After the activation of the diagnostic window, in a step S5 the difference or the integral of the difference between the measured intake manifold pressure and the modelled intake manifold pressure is determined.

In a step S6, an interrogation occurs as to whether the determined difference or the integral of the difference is greater than a predefined threshold value. If this is not the case, the process returns to step S6. On the other hand, if this is the case, a transition to step S7 takes place in which a measure is taken. This measure can be, for example, an entry in a fault register or a deactivation of the crankcase function.

After this step S7, the method is ended.

Multiple advantages may be achieved by the implementing the teachings described above:

The detection of a fault in the region of the connecting hose 53 between the crank case 20 and the intake manifold 13 without the need for the presence of additional components such as a switching valve, a differential pressure sensor, etc. The methods furthermore permit in many cases fault detection without the use of a lambda sensor or of a deflection of a lambda controller. The methods additionally permit the presence of leakage in the intake manifold 13 to be differentiated from the presence of dropping out of the connecting hose 53 between the crankcase 20 and the intake manifold 13. In addition, the methods described herein operate comparatively quickly, since it is not necessary to compare data items from a plurality of successive idling phases with one another.

LIST OF REFERENCE SIGNS

1 Intake tract
11 Throttle valve
13 Intake manifold
14 Air mass meter
15 Temperature sensor for intake air
16 Intake manifold pressure sensor
17 Lubricant, engine oil
2 Engine block
20 Crankcase
21 Crankshaft
22 Crankshaft angle sensor
24 Piston
25 Connecting rod
3 Cylinder head
30 Gas inlet valve
31 Gas outlet valve
32, 33 Valve drive
34 Injection valve
35 Spark plug
36 Temperature sensor for internal combustion engine
37 Throttle valve angle sensor
4 Exhaust gas tract
40 Exhaust gas catalytic converter
41 Exhaust gas probe
5 Crankcase ventilation apparatus
51 First duct, fresh air feed line
53 Second duct
54 Underpressure-regulating valve
6 Control device
61 Computational unit, processor
62 Program memory
63 Data store, value memory
64 Fault memory
65 Fault display apparatus
66 Crankcase model
7 Accelerator pedal
71 Pedal position encoder
AS Output signals
ES Input signals
Z1-Z4 Cylinders
N Engine speed
$P_{amb}$ Ambient pressure
$W_{ign}$ Ignition angle
$P_{upstrmthrottle}$ Pressure upstream of throttle valve
$P_{intakemanfpres}$ Intake manifold pressure
$T_{amb}$ Ambient temperature
$T_{coolant}$ Coolant temperature
$T_{intake}$ Intake manifold temperature
$T_{oil}$ Oil temperature
$P_{crnkcse}$ Pressure in the crankcase $M_{abs.air,crnkcse}$ Absolute air mass in the crankcase
$M_{abs.HC,crnkcse}$ Absolute fuel mass in the crankcase
$M_{abs.RG,crnkcse}$ Absolute residual gas mass in the crankcase
$MAF_{in,crnkcse}$ Fresh air mass flow into the crankcase
$MFL_{in,BlowBy}$ Blow-by mass flow into the crankcase
$MAF_{fa,crnkcse}$ Fresh air mass flow out of the crankcase
$MFL_{fa,crnkcse}$ Evaporated mass flow out of the crankcase
$MFL_{RG,crnkcse}$ Residual gas mass flow out of the crankcase

What is claimed is:

1. A method for checking the plausibility of the functionality of a crankcase ventilation system of an internal combustion engine, wherein crankcase ventilation system has a crankcase, an intake tract equipped with an intake manifold, and a connecting line arranged between the crankcase and the intake manifold, the method comprising:
   detecting an occurrence of a negative load change;
   in response, comparing a measured intake manifold pressure with a modelled intake manifold pressure using acquired operating variables of the internal combustion engine and of a crankcase model;
   wherein the connecting line pneumatically connects a free volume of the crankcase to the intake tract at a point downstream of a throttle valve in the intake tract;
   comparing the measured intake manifold pressure to the measured ambient pressure;
   if the measured intake manifold pressure is higher than the ambient pressure, waiting until a negative load change occurs;
   upon detecting an occurrence of a negative load change, comparing the measured intake manifold pressure to the measured ambient pressure,
   activating a diagnostic window if the measured intake manifold pressure undershoots the measured ambient pressure;
   calculating a difference or an integral of the difference between the measured intake manifold pressure and the modelled intake manifold pressure within the diagnostic window;
   comparing the determined difference or the integral of the difference to a predefined threshold value; and
   if the determined difference or the integral of the difference is greater than the threshold value, detecting whether the connecting line arranged between the crankcase and the intake manifold has a blockage or drops out.

2. The method as claimed in claim 1, further comprising adapting operation of the internal combustion engine in response to detecting the connecting line arranged between the crankcase and the intake manifold has a blockage or drops out.

3. The method as claimed in claim 2, wherein adapting operation of the internal combustion engine includes making an entry is made in a fault register or deactivating a crankcase function or displaying a fault.

4. An internal combustion engine comprising:
   a crankcase ventilation system;
   a crankcase;
   an intake tract equipped with an intake manifold;
   a connecting line arranged between the crankcase and the intake manifold, wherein the connecting line pneumatically connects a free volume of the crankcase to the intake tract at a point downstream of a throttle valve in the intake tract; and
   a control apparatus having a processor and a memory storing instructions, when loaded and execute by the processor, configure the processor to:
   detect an occurrence of a negative load change;
   in response, compare a measured intake manifold pressure with a modelled intake manifold pressure using acquired operating variables of the internal combustion engine and of a crankcase model;
   comparing the measured intake manifold pressure to the measured ambient pressure;
   if the measured intake manifold pressure is higher than the ambient pressure, waiting until a negative load change occurs;
   upon detecting an occurrence of a negative load change, comparing the measured intake manifold pressure to the measured ambient pressure,
   activating a diagnostic window if the measured intake manifold pressure undershoots the measured ambient pressure;
   calculating a difference or an integral of the difference between the measured intake manifold pressure and the modelled intake manifold pressure within the diagnostic window;
   comparing the determined difference or the integral of the difference to a predefined threshold value; and
   if the determined difference or the integral of the difference is greater than the threshold value, detecting whether the connecting line arranged between the crankcase and the intake manifold has a blockage or drops out.

* * * * *